(12) United States Patent
Shin

(10) Patent No.: US 9,703,911 B2
(45) Date of Patent: Jul. 11, 2017

(54) METHOD FOR LIBRARY HAVING BASE CELL AND VT-RELATED

(71) Applicant: TAIWAN SEMICONDUCTOR MANUFACTURING COMPANY, LTD., Hsinchu (TW)

(72) Inventor: YangJae Shin, Hsinchu (TW)

(73) Assignee: TAIWAN SEMICONDUCTOR MANUFACTURING COMPANY, LTD. (TW)

( * ) Notice: Subject to any disclaimer, the term of this patent is extended or adjusted under 35 U.S.C. 154(b) by 144 days.

(21) Appl. No.: 14/700,563

(22) Filed: Apr. 30, 2015

(65) Prior Publication Data

US 2016/0321388 A1 Nov. 3, 2016

(51) Int. Cl.
*G06F 17/50* (2006.01)

(52) U.S. Cl.
CPC ...... *G06F 17/5068* (2013.01); *G06F 2217/02* (2013.01)

(58) Field of Classification Search
CPC ............. G06F 17/5045; G06F 17/5068; G06F 17/5081; G03F 1/36; G03F 7/70
USPC .................................. 716/55, 100, 110, 119
See application file for complete search history.

(56) References Cited

U.S. PATENT DOCUMENTS

| | | | |
|---|---|---|---|
| 8,601,416 B2 | 12/2013 | Kuo et al. | |
| 8,762,900 B2 | 6/2014 | Shin et al. | |
| 8,775,993 B2 | 7/2014 | Huang et al. | |
| 8,887,116 B2 | 11/2014 | Ho et al. | |
| 2004/0230924 A1* | 11/2004 | Williams | G06F 17/505 716/103 |
| 2006/0273821 A1* | 12/2006 | Correale, Jr. | G06F 17/505 326/31 |
| 2010/0070933 A1* | 3/2010 | Quach | G06F 17/5031 716/132 |
| 2014/0035106 A1* | 2/2014 | Vu | H01L 23/544 257/620 |
| 2014/0101623 A1 | 4/2014 | Chen et al. | |
| 2014/0201692 A1 | 7/2014 | Chen et al. | |
| 2014/0237435 A1 | 8/2014 | Chen et al. | |
| 2014/0282337 A1 | 9/2014 | Yuh et al. | |
| 2014/0304670 A1 | 10/2014 | Su et al. | |
| 2014/0310675 A1 | 10/2014 | Liu et al. | |
| 2014/0325464 A1 | 10/2014 | Hsu et al. | |
| 2015/0143309 A1* | 5/2015 | De Dood | G06F 17/5068 716/107 |

(Continued)

*Primary Examiner* — Paul Dinh
(74) *Attorney, Agent, or Firm* — Hauptman Ham, LLP

(57) ABSTRACT

A method includes converting a first threshold voltage related (VT-related) cell of a first standard cell library to a first modified VT-related cell. The first standard cell library includes the first VT-related cell and a first base cell. The first VT-related cell and the first base cell each include different portions of a layout design of a first standard cell corresponding to a first performance setting. The method includes generating a second standard cell library based on the first base cell and the first modified VT-related cell. The first modified VT-related cell and the first base cell each include different portions of a layout design of a second standard cell corresponding to a second performance setting. The method further includes generating a layout design for an integrated circuit based on the second standard cell library; and forming a set of masks based on the layout design.

25 Claims, 7 Drawing Sheets

(56) References Cited

U.S. PATENT DOCUMENTS

| | | | | |
|---|---|---|---|---|
| 2015/0177609 A1* | 6/2015 | Mikami | ............... | G03F 1/36 |
| | | | | 716/53 |
| 2015/0371821 A1* | 12/2015 | Lin | ............... | H01J 37/3174 |
| | | | | 250/492.22 |
| 2016/0196379 A1* | 7/2016 | Adel | ............... | G03F 1/36 |
| | | | | 716/52 |

* cited by examiner

METHOD FOR LIBRARY HAVING BASE CELL AND VT-RELATED

BACKGROUND

In the design of modern integrated circuits, particularly digital circuits, standard cells having fixed functions are widely used. Standard cells are often pre-designed and stored in standard cell libraries corresponding to various predetermined fabrication processes and/or performance settings. In some applications, a standard cell includes a group of transistors and interconnection structures that provide a Boolean logic function, a storage function, or other predetermined functions. In some embodiments, one or more of the standard cells are logic gate cells. In some embodiments, a standard cell includes AND, OR, NAND, NOR, XOR, INV, AND-OR-Invert (AOI), OR-AND-Invert (OAI), MUX, Flip-flop, BUFF, latch, delay, clock cells, memory cells, or other types of digital or analog cells. At the time an integrated circuit is designed, a layout design of the standard cells is retrieved from the standard cell libraries and placed at desirable locations as a part of an overall layout design of the integrated circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
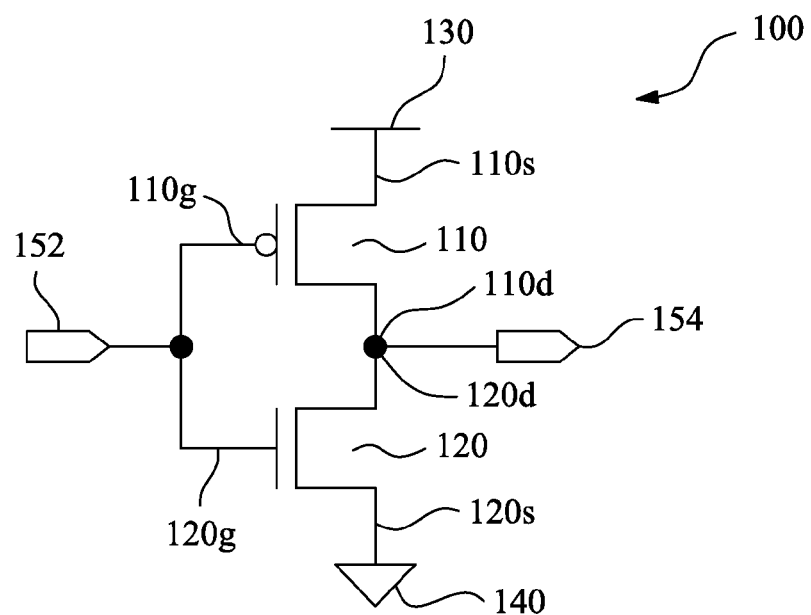
FIG. 1 is a circuit diagram of an inverter, in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a first standard cell library corresponding to a first performance setting is used for deriving a second standard cell library corresponding to a second performance setting by converting the corresponding threshold voltage related cells (also referred to herein as "VT-related cells") of the first standard cell library to modified VT-related cells of the second standard cell library. The method of generating the second standard cell library and manufacturing an integrated circuit based on the second standard cell library will be illustrated in detail in FIGS. 5 and 6 based on the examples as described in conjunction with FIGS. 1-4.

FIG. 1 is a circuit diagram of an inverter 100, in accordance with some embodiments. Inverter 100 includes a P-type transistor 110, an N-type transistor 120, a supply voltage node 130, a reference voltage node 140, an input terminal 152, and an output terminal 154. Supply voltage node 130 is configured to receive a supply voltage. Reference voltage node 140 is configured to receive a reference voltage or ground. Input terminal 152 is configured to receive an input signal, and output terminal 154 is configured to output an output signal, which is an inverted version of the input signal.

P-type transistor 110 and N-type transistor 120 are connected in series between supply voltage node 130 and reference voltage node 140. P-type transistor 110 includes a source terminal 110s, a drain terminal 110d, and a gate terminal 110g. Source terminal 110s is electrically coupled with supply voltage node 130. Drain terminal 110d is electrically coupled with output terminal 154. Gate terminal 110g is electrically coupled with input terminal 152. N-type transistor 120 includes a source terminal 120s, a drain terminal 120d, and a gate terminal 120g. Source terminal 120s is electrically coupled with reference voltage node 140. Drain terminal 120d is electrically coupled with output terminal 154. Gate terminal 120g is electrically coupled with input terminal 152.

Figure 2A:
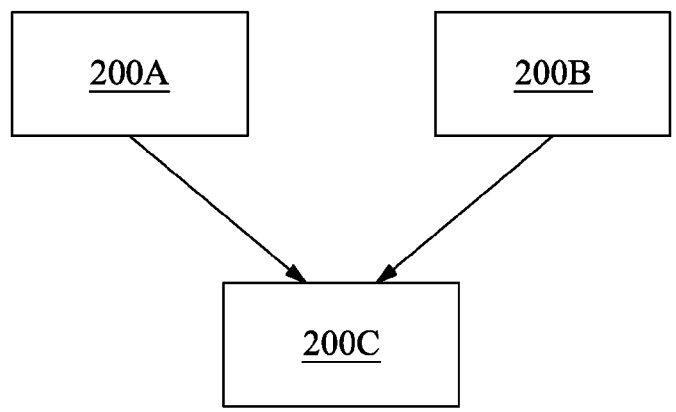
FIG. 2A is an entity relationship diagram of a base cell and a threshold voltage related cell and a corresponding consolidated layout standard cell for forming an inverter, in accordance with some embodiments.

FIG. 2A is an entity relationship diagram of a base cell 200A and a VT-related cell 200B in a standard cell library and a corresponding consolidated layout standard cell 200C for forming inverter 100, in accordance with some embodiments.

Consolidated layout cell 200C corresponds to a layout design of a standard cell, such as inverter 100 of FIG. 1. Base cell 200A and VT-related cell 200B correspond to different portions of the layout design of the standard cell. Base cell 200A includes the layout patterns and/or the layout layers corresponding to the components of inverter 100 fabricated based on a predetermined manufacturing process that are irrelevant with regard to the adjustment of the transistor threshold voltages of various transistor devices of the inverter 100. VT-related cell 200B includes the layout patterns and/or the layout layers corresponding to the components of inverter 100 fabricated based on the predetermined manufacturing process that are relevant with regard to the adjustment of the transistor threshold voltages of various transistor devices of the inverter 100.

In some embodiments, during a layout stage for designing an integrated circuit, a software tool is capable of generating a consolidated layout standard cell 200C for implementing inverter 100 by overlaying base cell 200A and the corresponding VT-related cell 200B. In some embodiments, the generation of consolidated layout standard cell 200C is performed prior to the layout stage.

Figure 2B:
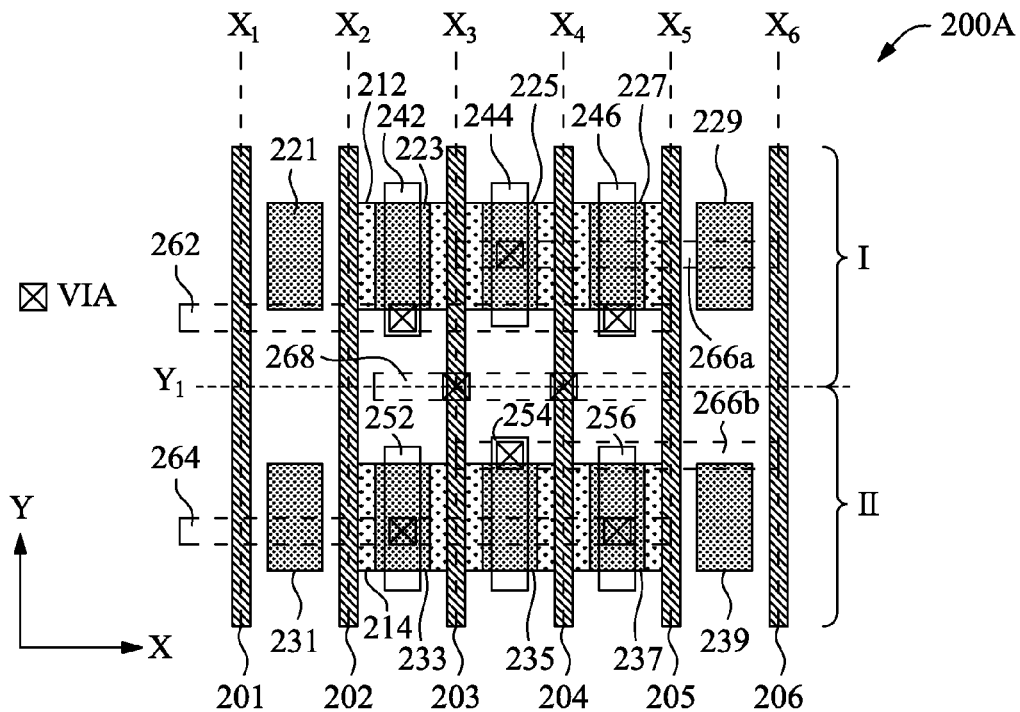
FIG. 2B is a layout diagram of the base cell of FIG. 2A, in accordance with some embodiments.

FIG. 2B is a layout diagram of the base cell 200A of FIG. 2A, in accordance with some embodiments. Base cell 200A includes a P-type transistor region I on one side of a reference line $Y_1$ and an N-type transistor region II on the other side of reference line $Y_1$. Reference line $Y_1$ extends along an X direction. P-type transistor region I corresponds to a region for forming a P-type transistor, such as transistor 110. N-type transistor region II corresponds to a region for forming an N-type transistor, such as transistor 120. Base cell 200A includes six gate electrode layout patterns 201, 202, 203, 204, 205, and 206 extending along a Y direction across reference lines $X_1$, $X_2$, $X_3$, $X_4$, $X_5$, and $X_6$, respectively. Reference lines $X_1$, $X_2$, $X_3$, $X_4$, $X_5$, and $X_6$ extend along an X direction different from the Y direction. In some embodiments, the X direction is perpendicular to the Y direction. Gate electrode layout patterns 203 and 204 correspond to gate terminals 110g of transistor 110 and 120g of transistor 120.

Base cell 200A includes an active region layout pattern 212 in P-type transistor region I, an active region layout pattern 214 in N-type transistor region II, a plurality of conductive layout patterns 221, 223, 225, 227, 229, 231, 233, 235, 237, and 239 corresponding to a first conductive layer, a plurality of conductive layout patterns 242, 244, 246, 252, 254, and 256 corresponding to a second conductive layer, a plurality of conductive layout patterns 262, 264, 266a, 266b, and 268 corresponding to a third conductive layer, and a plurality of via layout patterns VIA corresponding to a via layer.

Active region layout pattern 212 extends along the Y direction between reference line $X_2$ and reference line $X_5$. Active region layout pattern 212 corresponds to forming a source, drain, and channel region of P-type transistor 110. The portions of active region layout pattern 212 between reference lines $X_2$ and $X_3$ and between reference lines $X_4$ and $X_5$ correspond to source terminal 110s. The portion of active region layout pattern 212 between reference lines $X_3$ and $X_4$ corresponds to drain terminal 110d.

Active region layout pattern 214 extends along the Y direction between reference line $X_2$ and reference line $X_5$. Active region layout pattern 214 corresponds to forming a source, drain, and channel region of N-type transistor 120. The portions of active region layout pattern 214 between reference lines $X_2$ and $X_3$ and between reference lines $X_4$ and $X_5$ correspond to source terminal 120s. The portion of active region layout pattern 214 between reference lines $X_3$ and $X_4$ corresponds to drain terminal 120d.

Each conductive layout pattern of conductive layout patterns 221, 223, 225, 227, and 229 is placed between two corresponding gate electrode layout patterns of electrode layout patterns 201, 202, 203, 204, 205, and 206. Each conductive layout pattern of conductive layout patterns 231, 233, 235, 237, and 239 is placed between two corresponding gate electrode layout patterns of electrode layout patterns 201, 202, 203, 204, 205, and 206. In some embodiments, the first conductive layer corresponds to a first metal zero over oxide diffusion (M0OD-1) layer.

Conductive layout patterns 242, 244, and 246 overlap conductive layout patterns 223, 225, and 227, respectively. Conductive layout patterns 252, 254, and 256 overlap conductive layout patterns 233, 235, and 237, respectively. In some embodiments, the second conductive layer corresponds to a second metal zero over oxide diffusion (M0OD-2) layer over the M0OD-1 layer.

Conductive layout patterns 262, 264, 266a, 266b, and 268 extend along the X direction. Conductive layout pattern 262 overlaps a portion of conductive layout patterns 242 and 246 and corresponds to forming supply voltage node 130. Conductive layout pattern 264 overlaps a portion of conductive layout patterns 252 and 256 and corresponds to forming reference voltage node 140. Conductive layout pattern 266a overlaps a portion of conductive layout pattern 244, and conductive layout pattern 266b overlaps a portion of conductive layout pattern 254. Conductive layout patterns 266a and 266b correspond to forming output terminal 154. Conductive layout pattern 268 overlaps a portion of gate electrode layout patterns 203 and 204 and corresponds to forming input terminal 152.

Moreover, via layout patterns VIA correspond to forming via plugs that variously connect the resulting features of: conductive layout patterns 242 and 262; conductive layout patterns 246 and 262; conductive layout patterns 244 and 266a; conductive layout patterns 252 and 264; conductive layout patterns 256 and 264; conductive layout patterns 254 and 266b; conductive layout pattern 268 and gate electrode layout pattern 203; and conductive layout pattern 268 and gate electrode layout pattern 204.

Figure 2C:
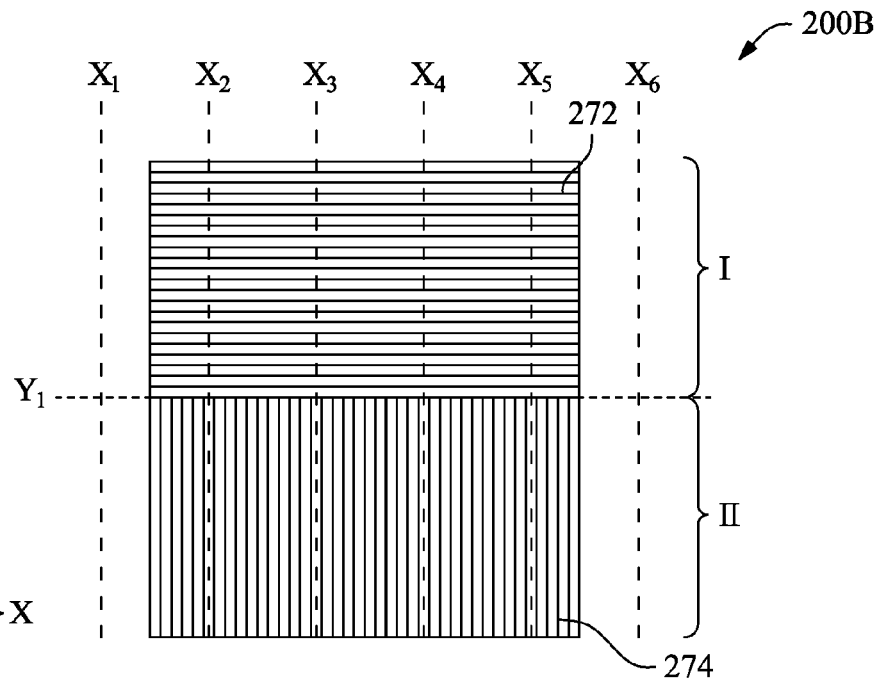
FIG. 2C is a layout diagram of a VT-related cell of FIG. 2A, in accordance with some embodiments.

FIG. 2C is a layout diagram of a VT-related cell 200B of FIG. 2A, in accordance with some embodiments.

VT-related cell 200B includes an N-well layout pattern 272 in P-type transistor region I and a P-well layout pattern 274 in N-type transistor region II. N-well layout pattern 272 corresponds to forming an N-well as a bulk structure on which transistor 110 is formed. A threshold voltage of transistor 110 varies with a dopant and doping concentration assigned to N-well layout pattern 272. P-well layout pattern 274 corresponds to forming a P-well as a bulk structure on which transistor 120 is formed. A threshold voltage of transistor 120 varies with a dopant and doping concentration assigned to P-well layout pattern 274.

FIGS. 2B and 2C are used as an example of how a layout design (as represented by consolidated layout standard cell 200C) of a standard cell is separated into a base cell 200A and a VT-related cell 200B. In some embodiments, other approaches to separately store different portions of a layout design of a standard cell into a base cell and a corresponding VT-related cell are within the scope of various embodiments.

In some embodiments, a predetermined manufacturing process is capable of fabricating various transistor devices that are similar in size and shape but have different electrical characteristics, such as different transistor threshold voltages thereof. In some embodiments, various standard cell libraries associated with the predetermined manufacturing process are configured for different requirements for operational speeds and/or leakage currents but still having similar layout patterns with respect to their sizes and shapes. For example, a standard cell library for faster speed but higher leakage includes transistor devices having lower transistor threshold voltages than counterpart transistor devices in another standard cell library for slower speed but lower leakage. In some embodiments, various standard cell libraries for different requirements for operational speeds and/or leakage currents are referred to as an ultra-low threshold voltage (ULVT) library, a low threshold voltage (LVT) library, or a standard threshold voltage (SVT) library, or the like.

Figure 3:
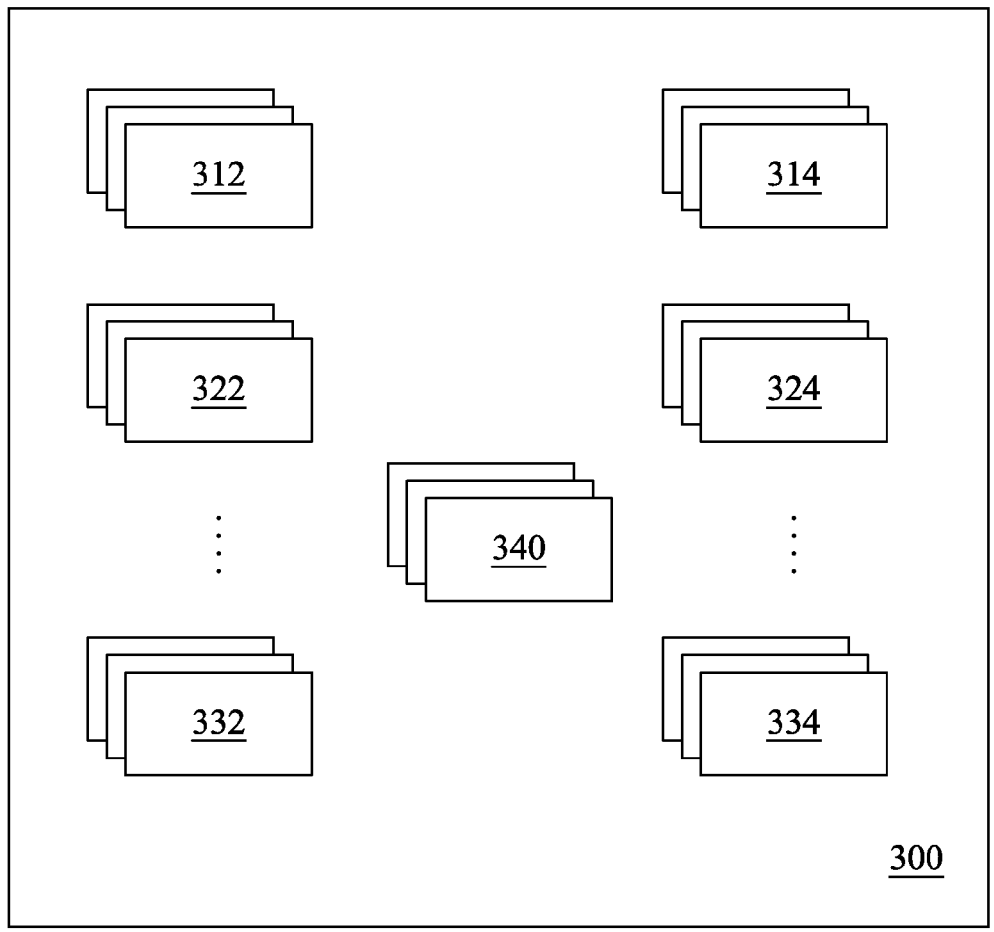
FIG. 3 is a block diagram of a standard cell library corresponding to a first performance setting, in accordance with some embodiments.
Figure 4:
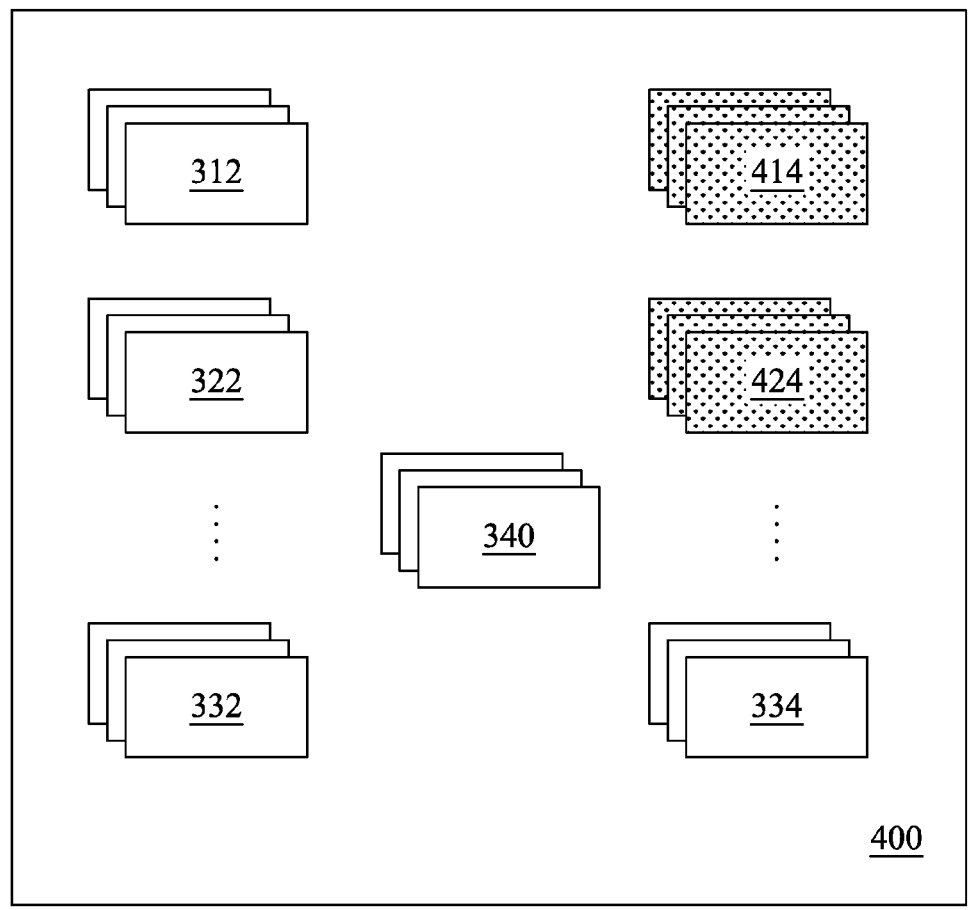
FIG. 4 is a block diagram of a standard cell library derived from the standard cell library of FIG. 3 and corresponding to a second performance setting, in accordance with some embodiments.
Figure 5:
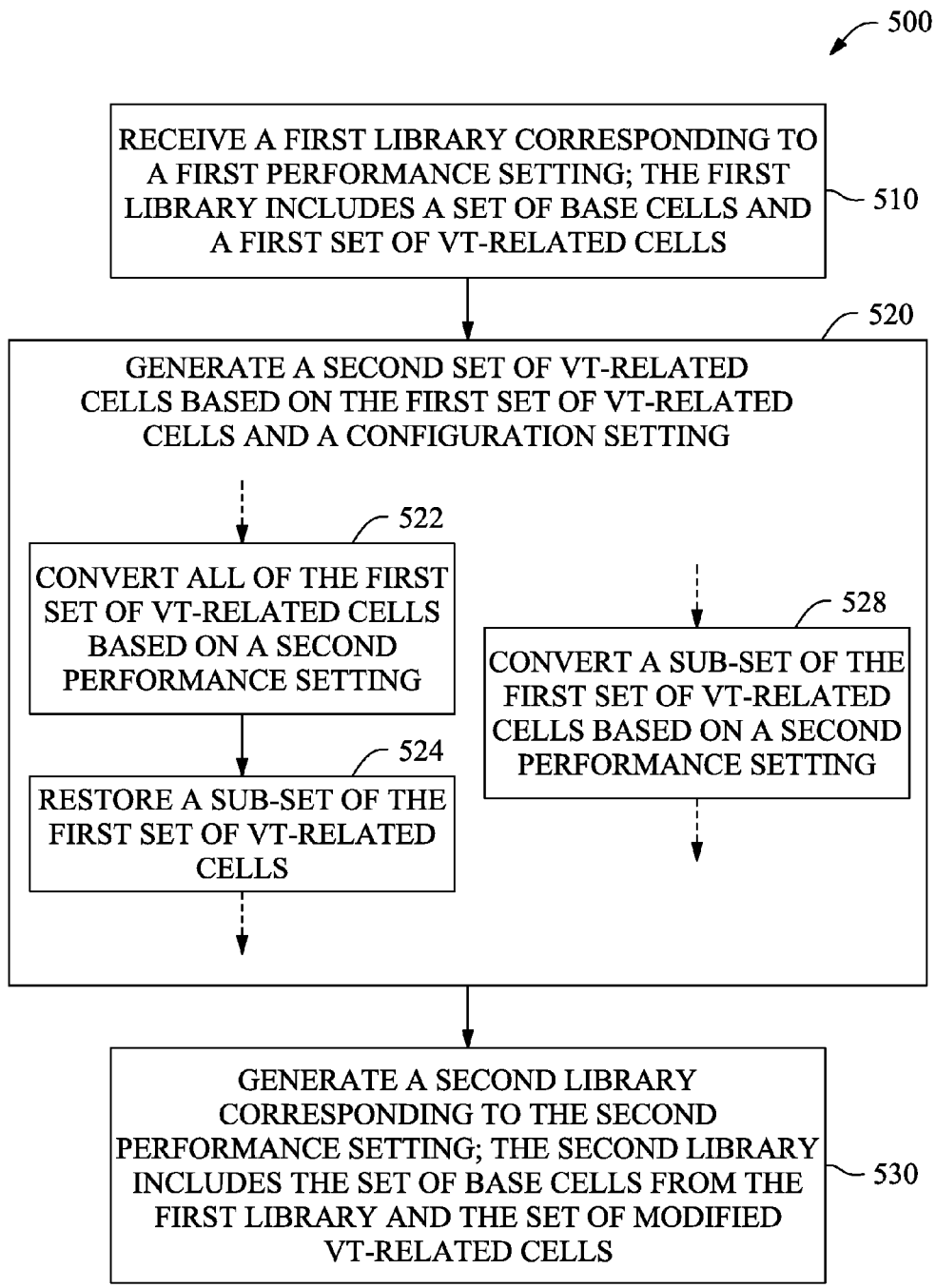
FIG. 5 is a flow chart of a method of converting a first standard cell library corresponding to a first performance setting to a second standard cell library corresponding to a second performance setting, in accordance with some embodiments.
Figure 6:
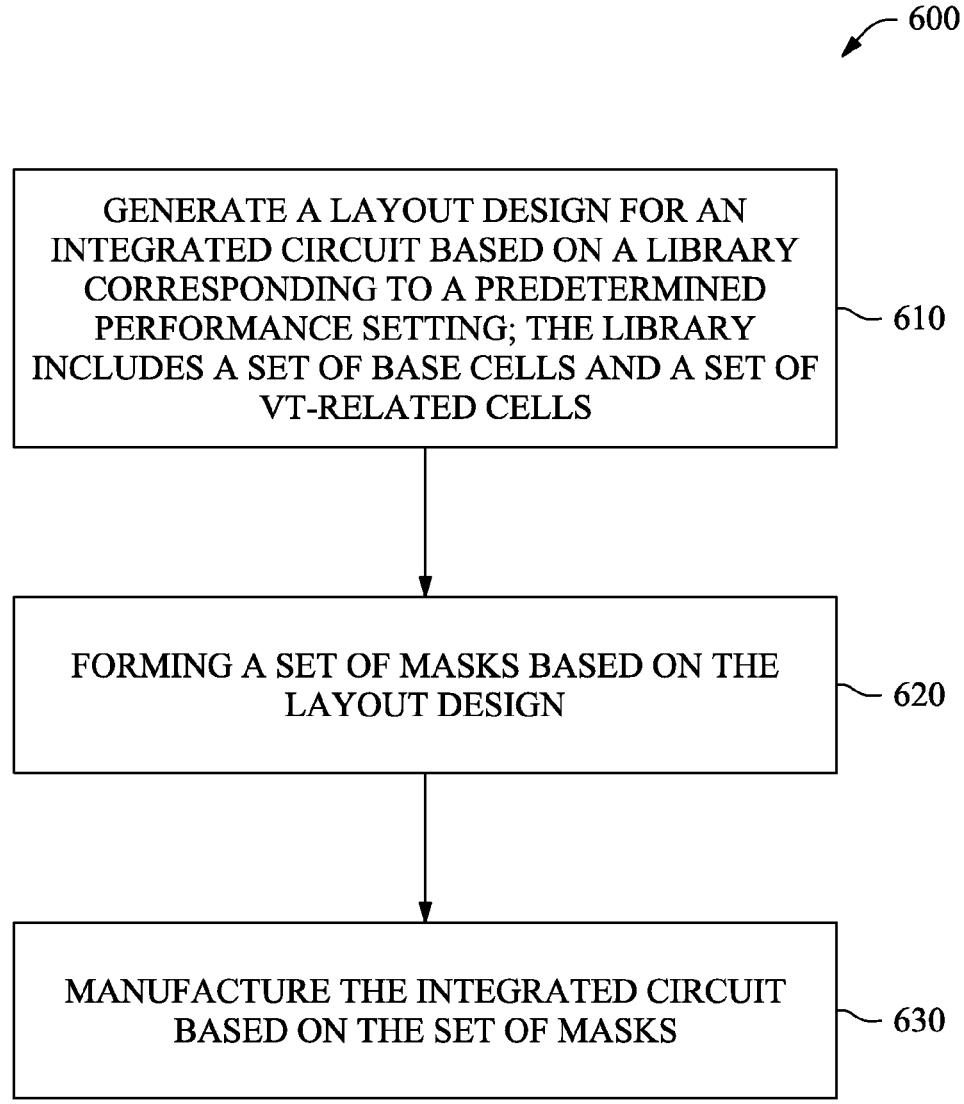
FIG. 6 is a flow chart of a method of making an integrated circuit based on a standard cell library, in accordance with some embodiments.

FIG. 3 is a block diagram of a standard cell library 300 corresponding to a first performance setting, in accordance with some embodiments. FIG. 4 is a block diagram of a standard cell library 400 derived from the standard cell library 300 of FIG. 3 and corresponding to a second performance setting, in accordance with some embodiments. For facilitating the illustration of the methods as depicted in FIGS. 5 and 6, the first performance setting corresponds to a faster operational speed and/or a greater leakage current than those of the second performance setting. For example, in some embodiments, standard cell library 300 is an ULVT library and standard cell library 400 is an LVT library. In some embodiments, other arrangements with respect to differentiating the first performance setting from the second performance setting are within the scope of various embodiments.

In FIG. 3, standard cell library 300 includes a first plurality of base cells 312, a first plurality of VT-related cells 314 paired with the first plurality of base cells 312, a second plurality of base cells 322, a second plurality of VT-related cells 324 paired with the second plurality of base cells 322, a third plurality of base cells 332, a third plurality of VT-related cells 334 paired with the third plurality of base cells 332, and a plurality of consolidated layout cells 340. In some embodiments, base cells 312, 322, and 332, VT-related cells 312, 324, and 334, and consolidated layout cells 340 correspond to layout designs of various standard cells and are stored in a non-transitory storage device in a manner consistent with a Graphic Database System (GDS) file format.

First plurality of base cells 312 and first plurality of VT-related cells 314 have a one-to-one correspondence with each other. A member base cell of first plurality of base cells 312 and a corresponding member VT-related cell of first plurality of VT-related cells 314 include different portions of a layout design of a standard cell in a manner similar to the example illustrated in conjunction with FIGS. 1-2C. First plurality of base cells 312 and first plurality of VT-related cells 314 correspond to a first plurality of standard cells that include transistors having a first threshold voltage setting, such as an ULVT setting.

Second plurality of base cells 322 and second plurality of VT-related cells 324 also have a one-to-one correspondence with each other. A member base cell of second plurality of base cells 322 and a corresponding member VT-related cell of second plurality of VT-related cells 324 include different portions of a layout design of another standard cell. Second plurality of base cells 322 and second plurality of VT-related cells 324 correspond to a second plurality of standard cells that include transistors having a second threshold voltage setting, such as an LVT setting, corresponding to higher threshold voltages than those of the first threshold voltage setting.

Third plurality of base cells 332 and third plurality of VT-related cells 334 also have a one-to-one correspondence with each other. A member base cell of third plurality of base cells 332 and a corresponding member VT-related cell of third plurality of VT-related cells 334 include different portions of a layout design of another standard cell. Third plurality of base cells 332 and third plurality of VT-related cells 334 correspond to a third plurality of standard cells that include transistors having the ULVT setting, the LVT setting, a third threshold voltage setting, such as an SVT setting, or other threshold voltage setting.

Consolidated layout cells 340 correspond to a fourth plurality of standard cells that include transistors having the ULVT setting, the LVT setting, the SVT setting, or other threshold voltage setting. Compared with third plurality base cells 332 and third plurality of VT-related cells 334, a member cell of consolidated layout cells 340 already includes a layout design of a standard cell, in a manner similar to consolidated layout cell 200C, without separating them into a base cell and a VT-related cell.

The ULVT setting, the LVT setting, and the SVT setting refer to different transistor threshold voltage settings. The transistor threshold voltage ranges of ULVT, LVT, and SVT are comparable with one another based on a predetermined semiconductor manufacturing process. A transistor having the ULVT setting has a threshold voltage lower than that of a counterpart transistor having the LVT setting; and a transistor having the LVT setting has a threshold voltage lower than that of a counterpart transistor having the SVT setting. Only three different transistor threshold voltage settings are described in the present disclosure. In some embodiments, a predetermined manufacturing process is usable to form transistor devices of more or less than three transistor threshold voltage settings.

Moreover, only three pairs of groups of base cells and VT-related cells 312/314, 322/324, and 332/334 are depicted in FIG. 3. In some embodiments, there are more or less than three pairs of groups of base cells and VT-related cells. In some embodiments, standard cell library 300 does not include all of the pairs of groups of base cells and VT-related cells 312/314, 322/324, and 332/334. In some embodiments, standard cell library 300 does not include consolidated layout cells 340.

In FIG. 4, standard cell library 400 is derived from the standard cell library 300 of FIG. 3. Components in FIG. 4 that are the same or similar to those in FIG. 3 are given the same reference numbers, and detailed description thereof is thus omitted.

Standard cell library 400 includes the first plurality of base cells 312, a first plurality of modified VT-related cells 414 paired with the first plurality of base cells 312, the second plurality of base cells 322, a second plurality of modified VT-related cells 424 paired with the second plurality of base cells 322, the third plurality of base cells 332, the third plurality of VT-related cells 334, and the plurality of consolidated layout cells 340. In some embodiments, base cells 312, 322, and 332, VT-related cells 412, 424, and 334, and consolidated layout cells 340 correspond to layout designs of various standard cells and are stored in a non-transitory storage device in a manner consistent with a Graphic Database System (GDS) file format.

First plurality of base cells 312 and first plurality of modified VT-related cells 414 have a one-to-one correspondence with each other. First plurality of base cells 312 and first plurality of modified VT-related cells 414 correspond to a first plurality of modified standard cells that has layout patterns in similar size and shape as to those of the first plurality of standard cells of standard cell library 300 but includes transistors having a threshold voltage setting different from the first threshold voltage setting associated with VT-related cells 314. In some embodiments, first plurality of base cells 312 and first plurality of modified VT-related cells 414 correspond to the second threshold voltage setting, or also being referred to as the LVT setting.

Second plurality of base cells 322 and second plurality of modified VT-related cells 424 also have a one-to-one correspondence with each other. Second plurality of base cells 322 and second plurality of modified VT-related cells 424 correspond to a second plurality of modified standard cells that has layout patterns in similar size and shape as to those of the second plurality of standard cells of standard cell library 300 but includes transistors having a threshold voltage setting different from the second threshold voltage setting associated with VT-related cells 324. In some embodiments, second plurality of base cells 312 and second plurality of modified VT-related cells 424 correspond to the third threshold voltage setting, or also being referred to as the SVT setting.

Moreover, compared with standard cell library 300, third plurality of base cells 332, third plurality of VT-related cells 334, and consolidated layout cells 340 remain unchanged in standard cell library 400.

FIG. 5 is a flow chart of a method 500 of converting a first standard cell library 300 corresponding to a first performance setting to a second standard cell library 400 corresponding to a second performance setting, in accordance with some embodiments. FIG. 5 is illustrated in conjunction with the examples depicted in FIGS. 1-4. It is understood that additional operations may be performed before, during, and/or after the method 500 depicted in FIG. 5, and that some other processes may only be briefly described herein.

Method 500 begins with operation 510, where a first standard cell library 300 corresponding to a first performance setting is received. Standard cell library 300 includes a set of base cells, including the plurality of base cells 312, 322, and 332. Standard cell library 300 also includes a set of VT-related cells, including the plurality of VT-related cells 314, 324, and 334. In some embodiments, standard cell library 300 does not have one or more paired sets of base/VT-related cells 312/314, 322/324, or 332/334. Standard cell library 300 also includes a set of consolidated layout standard cells 340. In some embodiments, standard cell library 300 does not have consolidated layout standard cells 340.

Method 500 proceeds to operation 320, where a second standard cell library 400 is generated based on the set of base cells 312, 322, and 332, VT-related cells 334, modified VT-related cells 414 and 424, and the consolidated layout standard cells 340. Modified VT-related cells 414 and 424 are derived from VT-related cells 314 and 324 based on a predetermined configuration setting. The predetermined configuration setting indicates which group of VT-related cells (e.g., VT-related cells 314 or 324) is to be converted to corresponding modified VT-related cells for a different performance setting and/or which group of VT-related cells (e.g., VT-related cells 334) remains the same in the derived standard cell library 400.

Operation 520 is performed according to at least two different example approaches: (1) performing operation 522 followed by operation 524; or (2) performing operation 528.

With respect to approach (1), in operation 522, all VT-related cells 314, 324, and 334 of standard cell library 300 are converted to become modified VT-related cells 414, 424, and 434 (not labeled), respectively. Based on the predetermined configuration setting, VT-related cells 314, 324, and 334 are modified to correspond to increased threshold voltages. For example, VT-related cells 314 corresponding to the ULVT setting are converted to VT-related cells 414 corresponding to the LVT setting. VT-related cells 324 corresponding to the LVT setting are converted to VT-related cells 424 corresponding to the SVT setting. The VT-related cells within VT-related cells 334 that correspond to the ULVT setting are converted to their counterpart VT-related cells within modified VT-related cells 434 that correspond to the LVT setting; and the VT-related cells within VT-related cells 334 that correspond to the LVT setting are converted to their counterpart VT-related cells within modified VT-related cells 434 that correspond to the SVT setting.

In some embodiments, the conversion of VT-related cells from the ULVT setting to the LVT setting or from the LVT setting to the SVT setting is performed by changing the corresponding well layout patterns, such as well layout pattern 272 or 274 of FIG. 2C, to be associated with a different layout layer assigned with different dopant and/or different doping concentration. In some embodiments, other suitable modifications to other types of layout pattern in VT-related cells are within the scope of various embodiments.

Moreover, modifying VT-related cells from the ULVT setting to the LVT setting or from the LVT setting to the SVT setting are illustrated as non-limiting examples. In some embodiments, method 500 is applicable to VT-related cells among different transistor threshold voltage settings.

In operation 522, VT-related cells 334 are restored to replace modified VT-related cells 434. Accordingly, VT-related cells 334 remain the same in standard cell library 300 and standard cell library 400 regardless of the varied performance setting.

For example, a first base cell, such as base cell 200A, of cells 312 and a corresponding first VT-related cell, such as VT-related cell 200B, of cells 314 correspond to a first standard cell, such as standard cell 200C, that has an ULVT setting. The first base cell and the first VT-related cell include different portions of the first standard cell as described in conjunction with FIGS. 2A-2C. Also, a second base cell of cells 322 and a corresponding second VT-related cell of cells 324 correspond to a second standard cell that has an LVT setting; a third base cell of cells 332 and a corresponding second VT-related cell of cells 334 correspond to a third standard cell that also has an ULVT setting.

In operation 522, the first VT-related cell is converted to a first modified VT-related cell that has an LVT setting; the second VT-related cell is converted to a second modified VT-related cell that has an SVT setting; and the third VT-related cell is converted to a third modified VT-related cell that has an LVT setting. In some embodiments, the first, second, and third modified VT-related cells are compiled as a set of temporary VT-related cells.

Subsequently, in operation 524, the third modified VT-related cell is discarded and replaced with the third VT-related cell. As such, the set of temporary VT-related cells is rearranged into a set of VT-related cells that includes the first modified VT-related cell, the second modified VT-related cell, and the third VT-related cell.

In some embodiments, the predetermined configuration setting is stored in a form of a text file. A portion of a text file having the predetermined configuration setting in the form of various text strings is reproduced in Table I below as a non-limiting example.

TABLE I

| | | | |
|---|---|---|---|
| -anycell | -mvl 12=23 | -mvl 13=24 | // lvt to svt |
| -anycell | -mvl 151=12 | -mvl 152=13 | // ulvt to lvt |
| -cell INV_KEEP | -mvl 12=151 | -mvl 13=152 | // lvt back to ulvt |
| -cell SADEL_KEEP | -mvl 12=151 | -mvl 13=152 | // lvt back to ulvt |
| ..... | | | |

Expression "-anycell -mvl 12=23 -mvl 13=24" in Table I refers to converting VT-related cells 324 and a portion of VT-related cells 334 that correspond to the LVT setting to the SVT setting. Expression "-anycell -mvl 151=12 -mvl 152=13" in Table I refers to converting VT-related cells 314 and a portion of VT-related cells 334 that correspond to the ULVT setting to the LVT setting. Expression "-cell INV_KEEP -mvl 12=151-mvl 13=152" in Table I refers to resorting one of VT-related cells 334 that is associated with a name matching the string "INV_KEEP." Expression "-cell SADEL_KEEP -mvl 12=151-mvl 13=152" in Table I refers to resorting another one of VT-related cells 334 that is associated with a name matching the string "SADEL_KEEP."

With respect to approach (2), in operation 528, VT-related cells 334 are identified based on matching at least a portion of a cell name of the VT-related cells of standard cell library 300 with one or more predetermined strings in a manner similar to operation 524. Subsequently, VT-related cells 334 are retained and other VT-related cells 314 and 324 are converted to modified VT-related cells 414 and 424 in a manner similar to operation 522.

After operation 520, in operation 530, standard cell library 400 is generated to include base cells 312, 322, and 332 of standard cell library 300, modified VT-related cells 412 and 422, VT-related cells 334 of standard cell library 300, and consolidated layout standard cell 340.

In some embodiments, standard cell library 300 does not include all of the pairs of groups of base cells and VT-related cells 312/314, 322/324, and 332/334. In such scenario, standard cell library 400 does not include the absent pair(s) of groups of base cells and VT-related cells 312/314, 322/324, and 332/334. In some embodiments, standard cell library 300 does not include consolidated layout cells 340. In such scenario, standard cell library 400 also does not include consolidated layout cells 340.

FIG. 6 is a flow chart of a method 600 of making an integrated circuit based on a standard cell library, in accordance with some embodiments. In some embodiments, method 600 is performed based on standard cell library 400 generated based on performing method 500 depicted in FIG. 5 and standard cell library 300. It is understood that additional operations may be performed before, during, and/or after the method 600 depicted in FIG. 6, and that some other processes may only be briefly described herein.

Method 600 begins with operation 610, where a layout design for an interrelated circuit is generated based on a library, such as library 400, corresponding to a predetermined performance setting. In some embodiments, operation 610 and method 500 are performed by a executing a memory compiler program. In some embodiments, operation 610 and method 500 are performed by executing two or more different Electronic Design Automation (EDA) programs.

Method 600 proceeds to operation 620, where a set of masks is formed based on the layout design. Then, in operation 630, the integrated circuit is manufactured based on the set of masks. The set of masks are usable in operation 630 in various etching, growing, or implanting stages of the manufacture of the integrated circuit in order to form various components having the size, shape, and electrical and physical characteristics as contemplated by the layout design. In some embodiments, a set of masks is usable in conjunction with various lithography processes of the manufacture of the integrated circuit.

Figure 7:
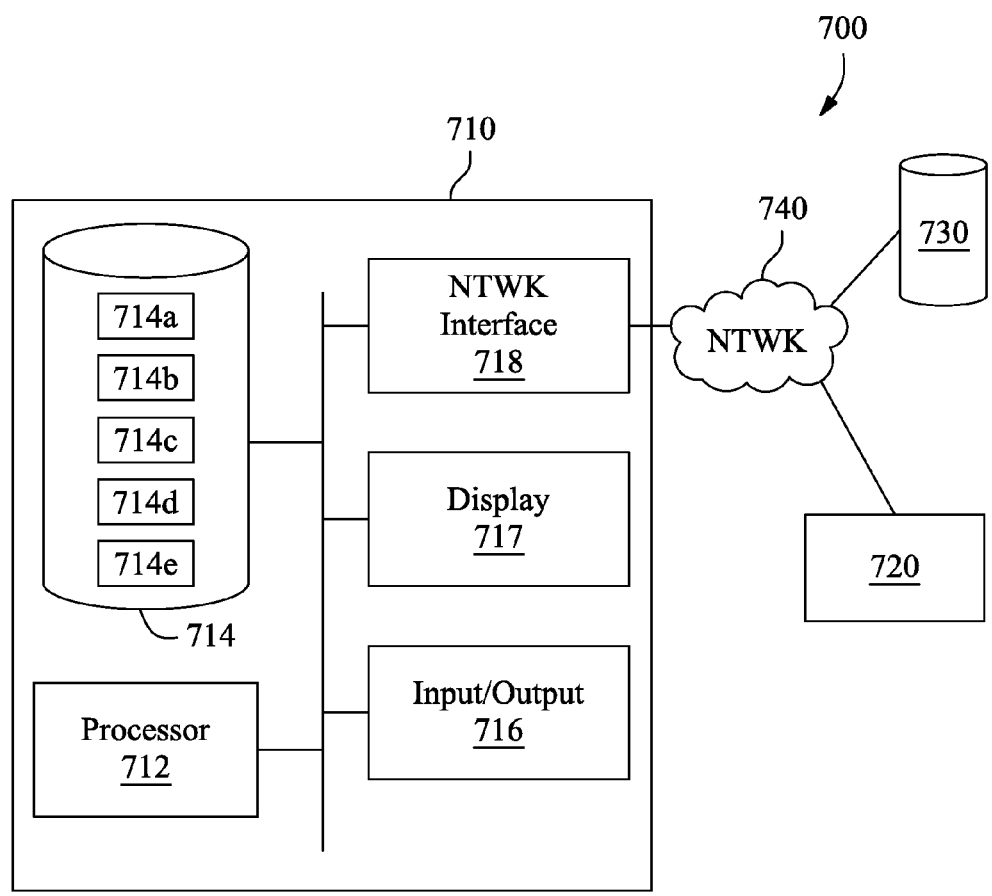
FIG. 7 is a functional block diagram of an integrated circuit (IC) designing system usable for performing at least a portion of the method depicted in FIG. 5 or at least a portion of the method depicted in FIG. 6, in accordance with one or more embodiments.

FIG. 7 is a functional block diagram of an IC designing system usable for performing at least a portion of the method 500 depicted in FIG. 5 or at least a portion of the method 600 depicted in FIG. 6, in accordance with one or more embodiments.

IC designing system 700 includes a first computer system 710, a second computer system 720, a networked storage device 730, and a network 740 connecting the first computer system 710, the second computer system 720, and the networked storage device 730. In some embodiments, IC designing system 700 does not include one or more of the second computer system 720, the storage device 730, or the network 740.

The first computer system 710 includes a hardware processor 712 communicatively coupled with a non-transitory, computer readable storage medium 714 encoded with, i.e., storing, a set of instructions 714a, a standard cell library 714b, a modified standard cell library 714c, a layout design 714d, or any intermediate data 714e for executing the set of instructions 714a. The processor 712 is electrically and communicatively coupled with the computer readable storage medium 714. The processor 712 is configured to execute the set of instructions 714a encoded in the computer readable storage medium 714 in order to cause the computer 710 to be usable as an IC designing system, including functionalities such as converting a library 300 to a library 400 consistent with the embodiments of FIG. 5 and/or forming a layout design consistent with the embodiments of FIG. 6.

In some embodiments, a portion or all of the set of instructions 714a, the standard cell library 714b, the modified standard cell library 714c, the layout design 714d, or any intermediate data 714e are stored in a non-transitory storage medium other than storage medium 714, such as in a non-transitory storage medium in networked storage device 730 or second computer system 720. In such case, some or all of the set of instructions 714a, the standard cell library 714b, the modified standard cell library 714c, the layout design 714d, or any intermediate data 714e stored outside computer 710 is accessible by the processor 712 through the network 740.

In some embodiments, the processor 712 is a central processing unit (CPU), a multi-processor, a distributed processing system, an application specific integrated circuit (ASIC), and/or a suitable processing unit.

In some embodiments, the computer readable storage medium 714 is an electronic, magnetic, optical, electromagnetic, infrared, and/or a semiconductor system (or apparatus or device). For example, the computer readable storage medium 714 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 614 includes a compact disk-read only memory (CD-ROM), a compact disk-read/write (CD-R/W), and/or a digital video disc (DVD).

The computer system 710 further includes, in at least some embodiments, an input/output interface 716 and a display unit 717. The input/output interface 716 is coupled to the processor 712 and allows the circuit designer to manipulate the first computer system 710. In at least some embodiments, the display unit 717 displays the status of executing the set of instructions 714*a* and, in at least some embodiments, provides a Graphical User Interface (GUI). In at least some embodiments, the display unit 717 displays the status of executing the set of instructions 714*a* in a real time manner. In at least some embodiments, the input/output interface 716 and the display 717 allow an operator to operate the computer system 710 in an interactive manner.

In at least some embodiments, the computer system 710 also includes a network interface 718 coupled to the processor 712. The network interface 718 allows the computer system 710 to communicate with the network 740, to which one or more other computer systems are connected. The network interface includes wireless network interfaces such as BLUETOOTH, WIFI, WIMAX, GPRS, or WCDMA; or wired network interface such as ETHERNET, USB, or IEEE-1394.

In accordance with one embodiment, a method includes converting a first threshold voltage related (VT-related) cell of a first standard cell library to a first modified VT-related cell. The first standard cell library includes the first VT-related cell and a first base cell. The first VT-related cell and the first base cell each include different portions of a layout design of a first standard cell corresponding to a first performance setting. The method includes generating a second standard cell library based on the first base cell and the first modified VT-related cell. The first modified VT-related cell and the first base cell each include different portions of a layout design of a second standard cell corresponding to a second performance setting. The method further includes generating a layout design for an integrated circuit based on the second standard cell library; and forming a set of masks based on the layout design.

In accordance with another embodiment, a method includes converting a first set of threshold voltage related (VT-related) cells of a first standard cell library to a first set of modified VT-related cells. The first set of VT-related cells corresponds to a first transistor threshold voltage setting, and the first set of modified VT-related cells corresponds to a second transistor threshold voltage setting. The method includes generating a second standard cell library to include a first set of base cells of the first standard cell library and the first set of modified VT-related cells. The method also includes generating a layout design for an integrated circuit based on the second standard cell library; and forming a set of masks based on the layout design.

In accordance with another embodiment, a method includes converting a first standard cell library corresponding to a first performance setting into a second standard cell library corresponding to a second performance setting. The first standard cell library includes a first set of threshold voltage related (VT-related) cells and a set of base cells. The first set of VT-related cells and the set of base cells have a one-to-one correspondence with each other. The second standard cell library includes a second set of VT-related cells and the set of base cells. The second set of VT-related cells and the set of base cells have a one-to-one correspondence with each other. The method includes generating a layout design for a standard cell based on the second standard cell library; and forming a set of masks based on the layout design. The generating a layout design includes overlaying a base cell of the set of base cells and a corresponding VT-related cell of the second set of VT-related cells.

In accordance with another embodiment, an IC designing system includes a non-transitory storage medium encoded with a set of instructions; and a hardware processor communicatively coupled with the non-transitory storage medium. The hardware processor is configured to execute the set of instruction to convert a first set of threshold voltage related (VT-related) cells of a first standard cell library to a first set of modified VT-related cells; to generate a second standard cell library to include a first set of base cells of the first standard cell library and the first set of modified VT-related cells; and to generate a layout design for an integrated circuit based on the second standard cell library. The first set of VT-related cells corresponds to a first transistor threshold voltage setting, and the first set of modified VT-related cells corresponds to a second transistor threshold voltage setting.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
   converting a first threshold voltage related (VT-related) cell of a first standard cell library to a first modified VT-related cell, the first standard cell library comprising the first VT-related cell and a first base cell, the first VT-related cell and the first base cell each comprising different portions of a layout design of a first standard cell corresponding to a first performance setting, the different portions being overlaid to obtain the layout design of the first standard cell;
   generating a second standard cell library based on the first base cell and the first modified VT-related cell, the first modified VT-related cell and the first base cell each comprising different portions of a layout design of a second standard cell corresponding to a second performance setting;
   generating a layout design for an integrated circuit based on the second standard cell library; and
   forming a set of masks based on the layout design.

2. The method of claim 1, further comprising:
   converting a plurality of VT-related cells of the first standard cell library to a first plurality of modified VT-related cells, comprising:
      converting the first VT-related cell of the first standard cell library to the first modified VT-related cell, the first plurality of modified VT-related cells comprising the first modified VT-related cell; and
      converting a second VT-related cell of the first standard cell library to a second modified VT-related cell, the first plurality of modified VT-related cells comprising the second modified VT-related cell; and
   converting the first plurality of modified VT-related cells to a second plurality of modified VT-related cells, comprising:

restoring the second VT-related cell of the first standard cell library to replace the second modified VT-related cell,
wherein generating the second standard cell library is performed based on the second plurality of modified VT-related cells and a plurality of base cells corresponding to the plurality of VT-related cells of the first standard cell library, the plurality of base cells comprising the first base cell.

3. The method of claim 2, further comprising:
identifying the second VT-related cell of the first standard cell library based on matching at least a portion of a cell name of the second VT-related cell with one or more predetermined strings prior to performing restoring the second VT-related cell.

4. The method of claim 2, wherein converting the plurality of VT-related cells of the first standard cell library to the first plurality of modified VT-related cells comprises:
replacing a first sub-set of the first plurality of VT-related cells corresponding to a first transistor threshold voltage setting with a first sub-set of the first plurality of modified VT-related cells corresponding to a second transistor threshold voltage.

5. The method of claim 4, wherein converting the plurality of VT-related cells of the first standard cell library to the first plurality of modified VT-related cells further comprises:
replacing a second sub-set of the first plurality of VT-related cells corresponding to the second transistor threshold voltage setting with a second sub-set of the first plurality of modified VT-related cells corresponding to a third transistor threshold voltage.

6. The method of claim 1, further comprising:
identifying a second VT-related cell of the first standard cell library based on matching at least a portion of a cell name of the second VT-related cell with one or more predetermined strings,
wherein generating the second standard cell library is performed further based on the second VT-related cell and a second base cell of the first standard cell library corresponding to the second VT-related cell.

7. The method of claim 1, wherein the first VT-related cell, the first modified VT-related cell, and the first base cell are stored in a non-transitory storage device in a manner consistent with a Graphic Database System (GDS) file format.

8. A method, comprising:
converting a first set of threshold voltage related (VT-related) cells of a first standard cell library to a first set of modified VT-related cells, the first set of VT-related cells corresponding to a first transistor threshold voltage setting, and the first set of modified VT-related cells corresponding to a second transistor threshold voltage setting;
generating a second standard cell library to include a first set of base cells of the first standard cell library and the first set of modified VT-related cells;
generating a layout design for an integrated circuit based on the second standard cell library, generating the layout design comprising overlaying a base cell of the first set of base cells and a corresponding modified VT-related cell of the first set of modified VT-related cells; and
forming a set of masks based on the layout design.

9. The method of claim 8, further comprising:
identifying a second set of VT-related cells of the first standard cell library based on a configuration setting,
wherein generating the second standard cell library comprises causing the second standard cell library to further include the second set of VT-related cells of the first standard cell library and a second set of base cells of the first standard cell library corresponding to the second set of VT-related cells of the first standard cell library.

10. The method of claim 9, wherein identifying the second set of VT-related cells of the first standard cell library comprises:
matching at least a portion of cell names of the second set of VT-related cells with one or more predetermined strings.

11. The method of claim 9, further comprising:
prior to performing identifying the second set of VT-related cells of the first standard cell library:
converting the second set of VT-related cells of the first standard cell library to a second set of modified VT-related cells; and
compiling a set of temporary VT-related cells that includes the first set of modified VT-related cells and the second set of modified VT-related cells; and
after performing identifying the second set of VT-related cells of the first standard cell library:
restoring the second set of VT-related cells of the first standard cell library to replace the second set of modified VT-related cells in the set of temporary VT-related cells.

12. The method of claim 8, further comprising:
converting a second set of VT-related cells of the first standard cell library to a second set of modified VT-related cells, the second set of VT-related cells corresponding to the second transistor threshold voltage setting, and the second set of modified VT-related cells corresponding to a third transistor threshold voltage setting,
wherein generating the second standard cell library comprises causing the second standard cell library to further include the second set of modified VT-related cells and a second set of base cells corresponding to the second set of VT-related cells of the first standard cell library.

13. The method of claim 8, wherein the first set of base cells of the first standard cell library, the first set of VT-related cells of the first standard cell library, and the first set of modified VT-related cells are stored in a non-transitory storage device in a manner consistent with a Graphic Database System (GDS) file format.

14. A method, comprising:
converting a first standard cell library corresponding to a first performance setting to a second standard cell library corresponding to a second performance setting, the first standard cell library comprising a first set of threshold voltage related (VT-related) cells and a set of base cells,
the first set of VT-related cells and the set of base cells having a one-to-one correspondence with each other,
the second standard cell library comprising a second set of VT-related cells and the set of base cells, and
the second set of VT-related cells and the set of base cells having a one-to-one correspondence with each other;
generating a layout design for a standard cell based on the second standard cell library, comprising overlaying a base cell of the set of base cells and a corresponding VT-related cell of the second set of VT-related cells; and
forming a set of masks based on the layout design.

15. The method of claim 14, wherein the converting the first standard cell library to the second standard cell library comprises:
converting a first sub-set of the first set of VT-related cells corresponding to a first transistor threshold voltage setting to a first sub-set of the second set of VT-related cells corresponding to a second transistor threshold voltage setting; and
retaining a second sub-set of the first set of VT-related cells as a second sub-set of the second set of VT-related cells.

16. The method of claim 15, further comprising:
identifying the second sub-set of the first set of VT-related cells based on matching at least a portion of cell names of the second sub-set of the first set of VT-related cells with one or more predetermined strings.

17. The method of claim 15, wherein the converting the first standard cell library to the second standard cell library further comprises:
converting a third sub-set of the first set of VT-related cells corresponding to the second transistor threshold voltage setting to a third sub-set of the second set of VT-related cells corresponding to a third transistor threshold voltage setting.

18. The method of claim 14, wherein the converting the first standard cell library to the second standard cell library comprises:
converting a first sub-set of the first set of VT-related cells corresponding to a first transistor threshold voltage setting to a first sub-set of a set of temporary VT-related cells corresponding to a second transistor threshold voltage setting;
converting a second sub-set of the first set of VT-related cells corresponding to the second transistor threshold voltage setting to a second sub-set of the set of temporary VT-related cells corresponding to a third transistor threshold voltage setting; and
restoring a third sub-set of the first set of VT-related cells in the set of temporary VT-related cells, thereby generating the second set of VT-related cells, at least a VT-related cell of the third sub-set of the first set of VT-related cells being a member of the first sub-set of the first set of VT-related cells or the second sub-set of the first set of VT-related cells.

19. The method of claim 18, further comprising:
identifying the third sub-set of the first set of VT-related cells based on matching at least a portion of cell names of the third sub-set of the first set of VT-related cells with one or more predetermined strings.

20. The method of claim 14, wherein the set of base cells, the first set of VT-related cells, and the second set of VT-related cells are stored in a non-transitory storage device in a manner consistent with a Graphic Database System (GDS) file format.

21. An IC designing system, comprising:
a non-transitory storage medium encoded with a set of instructions;
a hardware processor communicatively coupled with the non-transitory storage medium and configured to execute the set of instruction to:
convert a first set of threshold voltage related (VT-related) cells of a first standard cell library to a first set of modified VT-related cells, the first set of VT-related cells corresponding to a first transistor threshold voltage setting, and the first set of modified VT-related cells corresponding to a second transistor threshold voltage setting;
generate a second standard cell library to include a first set of base cells of the first standard cell library and the first set of modified VT-related cells; and
generate a layout design for an integrated circuit based on the second standard cell library, generating the layout design for the integrated circuit comprising overlaying a base cell of the first set of base cells and a corresponding modified VT-related cell of the first set of modified VT-related cells,
wherein the layout design is provided for fabricating the integrated circuit having the first transistor threshold voltage setting and the second transistor threshold voltage setting.

22. The IC designing system of claim 21, wherein the hardware processor is further configured to execute the set of instruction to:
identify a second set of VT-related cells of the first standard cell library based on a configuration setting; and
generate the second standard cell library by performing operations comprising:
causing the second standard cell library to further include the second set of VT-related cells of the first standard cell library and a second set of base cells of the first standard cell library corresponding to the second set of VT-related cells of the first standard cell library.

23. The IC designing system of claim 22, wherein the hardware processor is further configured to execute the set of instruction to:
identify the second set of VT-related cells of the first standard cell library by performing operations comprising:
matching at least a portion of cell names of the second set of VT-related cells with one or more predetermined strings.

24. The IC designing system of claim 22, wherein the hardware processor is further configured to execute the set of instruction to:
prior to performing identifying the second set of VT-related cells of the first standard cell library:
convert the second set of VT-related cells of the first standard cell library to a second set of modified VT-related cells; and
compile a set of temporary VT-related cells that includes the first set of modified VT-related cells and the second set of modified VT-related cells; and
after performing identifying the second set of VT-related cells of the first standard cell library:
restore the second set of VT-related cells of the first standard cell library to replace the second set of modified VT-related cells in the set of temporary VT-related cells.

25. The IC designing system of claim 21, wherein the hardware processor is further configured to execute the set of instruction to:
convert a second set of VT-related cells of the first standard cell library to a second set of modified VT-related cells, the second set of VT-related cells corresponding to the second transistor threshold voltage setting, and the second set of modified VT-related cells corresponding to a third transistor threshold voltage setting, generate the second standard cell library by performing operations comprising:
  causing the second standard cell library to further include the second set of modified VT-related cells and a second set of base cells corresponding to the second set of VT-related cells of the first standard cell library.

\* \* \* \* \*